(12) United States Patent
Beyer et al.

(10) Patent No.: US 8,770,037 B2
(45) Date of Patent: Jul. 8, 2014

(54) SYSTEM AND METHOD FOR STRUCTURE STIFFNESS DETERMINATION

(75) Inventors: Charles E. Beyer, Rochester, MI (US); James M. Dwornick, Brownstown, MI (US); Murthy Kowsika, Troy, MI (US); R. Elliott Crews, Ypsilanti, MI (US); David T. Chuey, Brownstown, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 318 days.

(21) Appl. No.: 13/273,649

(22) Filed: Oct. 14, 2011

(65) Prior Publication Data
US 2013/0091957 A1 Apr. 18, 2013

(51) Int. Cl.
*G01L 1/24* (2006.01)
(52) U.S. Cl.
USPC ............................................................. 73/800
(58) Field of Classification Search
USPC ...................... 73/12.01–12.14, 800
See application file for complete search history.

(56) References Cited

U.S. PATENT DOCUMENTS

| | | | | |
|---|---|---|---|---|
| 3,669,261 A * | 6/1972 | Moulin | ................. | 209/563 |
| 5,372,030 A * | 12/1994 | Prussia et al. | ................. | 73/37 |
| 5,374,129 A | 12/1994 | Vohr et al. | | |
| 5,804,707 A * | 9/1998 | Scarton et al. | ................. | 73/82 |
| 6,354,148 B2 * | 3/2002 | Sato et al. | ................. | 73/79 |
| 6,578,425 B2 | 6/2003 | Hickman | | |
| 6,769,287 B2 * | 8/2004 | Stewart et al. | ................. | 73/12.01 |
| 7,409,848 B2 * | 8/2008 | Petrinic et al. | ................. | 73/12.08 |
| 2012/0199738 A1 * | 8/2012 | Gerlach et al. | ................. | 250/307 |

FOREIGN PATENT DOCUMENTS

EP 0822410 A2 2/1998

* cited by examiner

*Primary Examiner* — Max Noori
(74) *Attorney, Agent, or Firm* — Ralph E. Smith

(57) ABSTRACT

In at least one implementation, a method for determining the stiffness of a structure may include connecting a test member to the structure, directing a beam of light at a measurement surface carried by at least one of the test member or the structure, impacting an impact surface carried by the test member with a known impact force, and determining the movement of the measurement surface that is caused by the impact. The movement of the measurement surface may be determined as a function of changes in the length of the beam of light and the stiffness of the structure may be a function of the magnitude of the measurement surface movement.

17 Claims, 3 Drawing Sheets

SYSTEM AND METHOD FOR STRUCTURE STIFFNESS DETERMINATION

FIELD

The present disclosure relates to a system for determining the stiffness of a structure.

BACKGROUND

In the design of at least certain structures, it may be desirable to measure the stiffness of the structure. One way to measure the stiffness includes providing a static load on the structure and measuring the linear deflection of the structure at the load point with a string pot. This permits measurement of the so-called static stiffness of the structure. However, such static testing does not give insight into the dynamic stiffness of the structure, such as when the structure is acted upon by, for example, low frequency dynamic loads. The dynamic stiffness may vary from the static stiffness, and the dynamic stiffness may vary over different frequencies of dynamic loads.

SUMMARY

In at least one implementation, a method for determining the stiffness of a structure may include connecting a test member to the structure, directing a beam of light at a measurement surface carried by at least one of the test member or the structure, impacting an impact surface carried by the test member with a known impact force, and determining the movement of the measurement surface that is caused by the impact. The movement of the measurement surface may be determined as a function of changes in the length of the beam of light and the stiffness of the structure may be a function of the magnitude of the measurement surface movement.

In another form, a system for determining the stiffness of a structure may include a test member, a beam generator, an impactor and a controller. The test member may be adapted to be connected to the structure and have an impact surface and a measuring surface. The beam generator may provide a beam of light onto the measuring surface. The impactor may have at least a portion moveable from a first position spaced from the impact surface to a second position engaged with the impact surface. And the controller may be responsive to changes in the beam of light in response to movement of the measurement surface caused by impacting the impact surface with the impactor. The controller may determine the magnitude of movement of the measurement surface which is a function of the stiffness of at least a portion of the structure in the area where the test member is connected to the structure.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DETAILED DESCRIPTION

Figure 1:
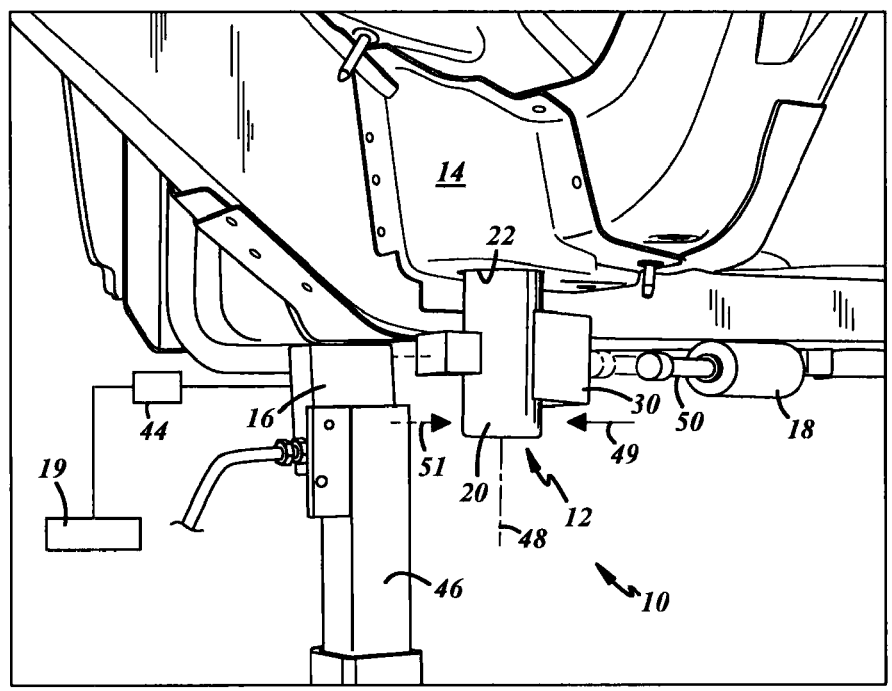
FIGS. 1 and 2 are enlarged fragmentary views illustrating a system for measuring the stiffness of the frame.
Figure 2:
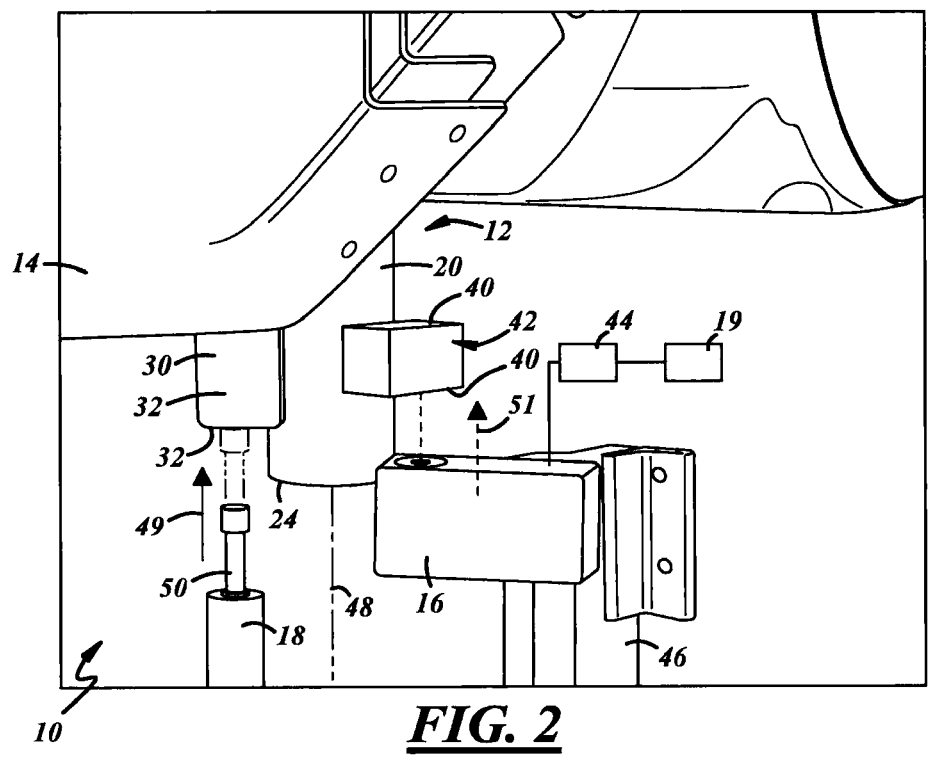

Referring in more detail to the drawings, FIGS. 1 and 2 illustrate a system 10 including an apparatus and method for determining the stiffness of a structure. The system may be used to measure the stiffness of substantially any desired structure, such as, but not limited to, an automotive frame component or a frame assembly, including all of an automotive body, parts thereof, or a complete automotive vehicle. Of course, other structures, such as water towers, bridges or other structures could have their stiffness measured by the system. The system may be used to measure both the static and dynamic stiffness of the structure.

The stiffness of a component or structure at a particular non-zero frequency may be termed a "dynamic stiffness". Stiffness at various frequencies may be lower than the stiffness for a static condition. Therefore, assuming that a static load cell stiffness measurement is constant over a given frequency range such that it represents the dynamic stiffness, may not be valid in at least certain structures. This may be true even at very low frequencies between 1 to 30 Hz. Similarly, assuming that higher frequency dynamic stiffness, for example above 30 Hz, represents the 0 Hz or static stiffness or a local stiffness at lower frequencies is generally not accurate.

In the context of an automotive vehicle, certain low frequency dynamic vibrations or forces may act on the vehicle in use. Such forces may be felt as a lateral shake of the vehicle body or a vertical hop and at least some of these dynamic conditions may occur at frequencies generally between 10 and 20 Hz. As a car is driven down a road, impact forces (e.g. from anomalies in the road) travel generally from the tire to the vehicle body and ultimately to the vehicle occupant. The body stiffness at the various frequencies of the impact forces will dictate how much displacement and force is ultimately transmitted to the occupant, how quickly those impact forces dampen out and how stable or sure footed the car "feels" to the driver and/or vehicle occupants.

Figure 3:
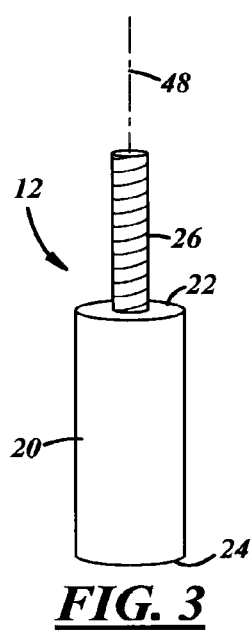
FIG. 3 is a perspective view of a main body of a test member that may be used in the system.
Figure 4:
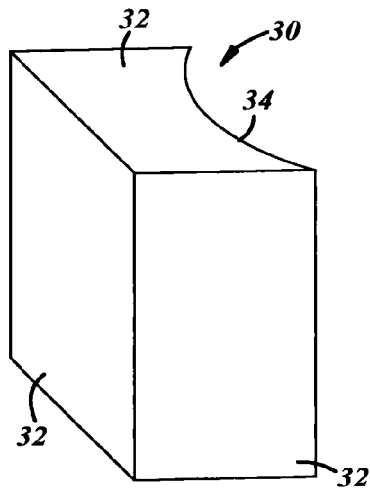
FIG. 4 is a perspective view of an impact member that may be coupled to the main body of FIG. 3.

The system 10 generally may include a test member 12 adapted to be connected to the structure 14 being tested, a beam generator 16, an impactor 18, and a controller 19. A portion of the test member 12 may be releasably connected to the structure 14 at one end or surface of the test member 12. The test member 12 may include a main body 20 adapted to be connected to the structure 14. The main body 20, in the implementation shown, is a right circular cylinder that is tubular and fixed to the structure at a first end 22. A second end 24 of the test member 12 extends away from the structure 14, and the main body 20 may have any desired length between its first and second ends 22, 24. Accordingly, in this implementation, the main body 20 has a generally circular periphery in cross section. The main body 20 may have substantially any other shape, as desired, including an oval, triangle, square or rectangular cross sectional shape, by way of examples without limitation. The main body 20 preferably is formed of a rigid, metal material that is stiffer than the structure 14 being tested. This enables the force of the impactor 18 to be transmitted relatively directly to the structure 14 with relatively little energy absorbed by the main body 20. In at least certain implementations, the main body 20 may have a stiffness that is between 3 and 10 times or more greater than the stiffness of the structure 14 being tested. The test member 12 could have a threaded shank 26 (FIG. 3) that is threaded into a complimentary threaded bore or boss on the structure 14, or it may be connected by a nut and bolt, a clamp, or other fastener by way of representative but not limiting examples of the connection between the test member 12 and the structure 14.

The test member 12 may include an impact surface 32 adapted to be struck or engaged by the impactor 18 to provide a force communicated to the structure 14 through the test member 12 and tending to flex or move at least a portion of the adjacent region of the structure 14. The impact surface 32 may be integral, and one piece with the main body 20 (such as a tab, protrusion, or other surface or feature formed in the same piece of material as the rest of the main body), or the impact surface 32 may be formed or defined on a separate member that is carried by or connected to the test member body 20. In the implementation shown, the impact surface 32 is a surface of a separate impact member 30. The impact member 30 may include more than one impact surface 32, and the impact surfaces 32 may be spaced apart and facing outwardly at different angles enabling the impact member 30 to be struck by the impactor 18 in different directions and at different locations across the impact member 30. In the implementation shown, the impact member 30 has five generally rectilinear faces which could all be impact surfaces 32 with an inner face 34 that may be complementarily shaped to the outer wall of the main body 20, and is shown in one implementation as being concave. Any of the exposed faces of the impact member, may be struck by the impactor 18, as desired.

To facilitate adjustment and positioning the impact member 30 as desired on the main body 20, the impact member 30 may be releasably and adjustably connected to the main body 20. The impact member 30 may be connected to the test member 12 in any releasable or non-releasable way, such as by a bolt, clamp, weld, adhesive, or it may be integral and formed in one-piece of material with the test member 12. In one form, the impact member 30 is a steel block that may be hot glued to the main body 20 so that it may be readily positioned anywhere along the exterior of the main body 20, as desired. The impact member 30 may be mounted to the main body 20 spaced from the structure so that the force of the impactor 18 is transmitted to the structure 14 through the test member 12 and not directly from the engagement of the impact member with the structure, although the impact member 30 could engage the structure 14 if desired.

Figure 5:
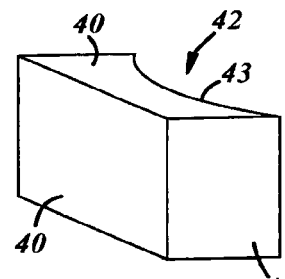
FIG. 5 is a perspective view of a measurement body that may be coupled to the main body of FIG. 3.

The test member 12 may also include a measurement surface 40. The measurement surface 40 may be integral and formed in one-piece with the body 20 of the test member 12, the impact member 30, or the structure 14 being tested or measured. Or the measurement surface 40 may be part of another body coupled to the test member 12, the impact member 30 or the structure 14 being tested. In one implementation, as shown in FIGS. 1, 2 and 5, the measurement surface 40 is part of a measurement body 42 carried by the body 20 of the test member 12. The measurement body 42 may be spaced from the impact member 30 and as shown, may be diametrically opposed to the impact member. Of course, the measurement body 42 may be located at any axial, radial and circumferential spacing relative to the impact member 30, or the measurement surface could be part of the impact member 30 if desired. The measurement body 42 may include more than one measurement surface 40, and like the impact member 30, may include a plurality of surfaces extending at different angles any of which may be used as a measurement surface.

The measurement body 42 may also have a mounting surface 43 that may be complementarily shaped to the main body 20. In use, the measurement surface 40 is used to reflect a beam directed onto the measurement surface by the beam generator 16. The measurement surface 40 preferably is rigidly fixed relative to the structure 14 being tested so that movement of the measurement surface 40 during testing is representative of the movement or displacement of the area of the structure 14 being tested.

The impactor 18 may be any device capable of providing a desired dynamic force or impact on the test member 12 and/or the impact member 30 carried by the test member 12. The impactor may be a pivoted or swinging weight or hammer, a pneumatic or hydraulic cylinder having a driven ram 50 (as shown in FIGS. 1 and 2) or plunger, or any other suitable device including electrically driven (e.g. servo) devices and the like. The impactor 18 may have at least a portion moveable from a first position spaced from the impact surface 32 to a second position engaged with the impact surface 32 to provide a desired impulse or momentary strike of the test member 12 and/or the impact member 30 to cause the structure 14 being tested to flex.

The beam generator 16 may direct a beam of light onto the measurement surface 40 to detect the position of the measurement surface 40. In one form, the beam generator is a laser beam or laser line generator. The beam of light may also be used to determine the magnitude of displacement or movement of the measurement surface 40 after the impactor 18 engages the impact surface 32. The magnitude of the measurement surface displacement may be used to determine the dynamic stiffness of the structure 14 at one or more frequencies or loads. A suitable frame or arm 46 may be used to position the beam generator and align it with the measurement surface, as desired.

In one implementation, the magnitude of the displacement of the measurement surface 40 is determined by directing a beam onto the measurement surface and detecting a reflection of the beam with a sensor 44, which may be part of an assembly and carried in the same housing as the beam generator, if desired. If the measurement surface 40 moves while the beam is provided on the measurement surface 40, the length (e.g. time) of the reflection will change and that change can be correlated with a magnitude of displacement of the measurement surface. In one form, the measurement surface 40 is perpendicular to the beam, and the beam is provided along a direction generally parallel to the direction of the impact on the impact member 30. The beam may be provided in the same general direction the impactor 18 travels (recognizing that the impactor 18 may rotate or swing about a pivot and hence, not travel in a straight line), or in the opposite direction.

Better results may be achieved with a more sensitive laser generator, especially where the displacement of the structure being tested is relatively small for the given impact load provided by the impactor. In the example of an automotive vehicle frame or similar component, the expected displacement might be on the order of a millimeter or two for a given impact load, and a laser sensitivity of about 3,000 mV/mm or greater has been found to provide satisfactory displacement determination and good coherence that captures the impact event and characterizes the low frequency and stiffness properly. In general, for very stiff structures higher laser sensitivity may be needed and/or a greater impact may be provided to the structure to cause sufficient displacement. For less stiff structures, lower sensitivity may be acceptable over a larger range of displacement of the structure after impact. In at least certain implementations, a higher sensitivity laser measuring over a larger range of displacement is best so that the process becomes less dependent on the magnitude of the impact provided on the structure to cause the displacement of the structure.

The light/laser beam direction and the impact direction may be generally parallel with a center axis 48 of the body 20, or at an angle thereto, including perpendicular to the center axis. If the light/laser beam and impact direction are not parallel to the center axis 48, then it may be desirable, at least in some applications, to locate the impact surface 32 and measurement surface 40 relatively close to the structure 14 so that any bending of the body 20 about its axis 48 is limited and movement of the measurement surface is attributed more to movement of the structure and not bending of the test member 12. Of course, bending of the test member 12 or absorption of energy by the test member 12 can be known and accounted for, by appropriate calibration or software calculation/determination. Therefore, a wide range of beam and impact direction angles can be used. Representative beam and impact paths or directions are shown by the arrows in FIGS. 1 and 2, where the impact path or direction is shown with a solid arrow 49 and the beam direction is shown by a dashed arrow 51. In FIG. 1, the impact and measurement paths or directions are perpendicular to the axis 48 of the main body 20. In FIG. 2, the impact and measurement paths or directions are parallel to the axis 48 of the main body 20. Of course, other angles and combination of angles may be used. In these implementations, the impact and measurement paths or directions may be parallel to each other which may include a coincident line or direction (e.g. as shown in FIG. 1, the beam may be provided diametrically opposed to and aligned with the impact path or direction, and as shown in FIG. 2, the beam may be parallel but laterally offset from the impact path or direction).

Figure 6:
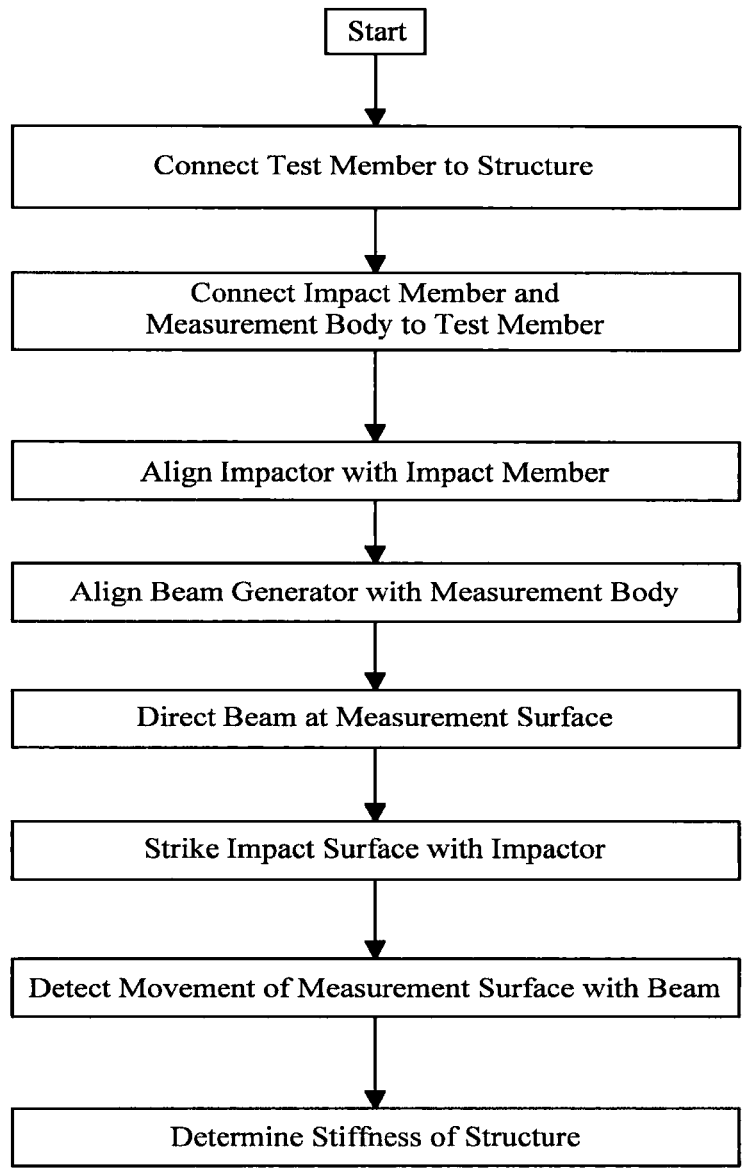
FIG. 6 is a flow chart of a method of determining stiffness of a structure.

As generally described in FIG. 6, to measure or determine the stiffness of a structure 14 or a portion of the structure, the test member 12 may be connected to the structure 14 by any appropriate means or mechanism. In the example shown, the threaded shank 26 of the test member 12 may be threaded into a mating boss structure 14. Once secured to the structure 14, the impact member 30 and measurement body 42 may be secured to the test member 12 and the impactor 18 and beam generator may be aligned with the impact surface 32 and measurement surface 40. The beam generator 16 can then direct a beam onto the measurement surface 40 and the impactor 18 can be activated to strike the impact surface 32. The force of the impact on the impact surface 32 is transmitted to the structure 14 through the test member 12. Flexing of the structure 14 due to the impact force is measured by the beam reflection off the measurement surface as recorded by the sensor 44. The sensor 44 may be coupled to the controller 19 that receives a signal or data from the sensor (which may be digitized) and determines the amount or magnitude of displacement of the measurement surface 40 that occurred as a result of the impact. The measured or determined displacement and force of the impact are used to determine the stiffness of the structure 14 under a given force and at a given frequency. These steps are exemplary only and may be carried out in a different order, in different combinations of steps, or with additional steps, as desired. For example, without limitation, the impact member 30 and measurement body 42 may be coupled or secured to the test member 12 before the test member 12 is connected to the structure 14. Still further modifications can be made.

The controller 19 may provide an output indicating the compliance of the structure 14 at the impact region which may be given in units of displacement/force (e.g. millimeters/ Newtons). The inverse of compliance can be termed the stiffness of the structure 14 for the applied dynamic load. The test and measurement may be repeated several times for each location or region of the structure 14, and this may be done relatively quickly as the impactor 18, beam generator 16 and controller 19 may be relatively easily reset for another measurement/test. The impact force or direction may be changed to test stiffness under a different load or different impact direction, and the test member 12 may be attached to multiple points or regions of the structure 14 to measure or determine the stiffness of various locations or features (e.g. couplings, joints, beams, etc) of the structure.

Figure 7:
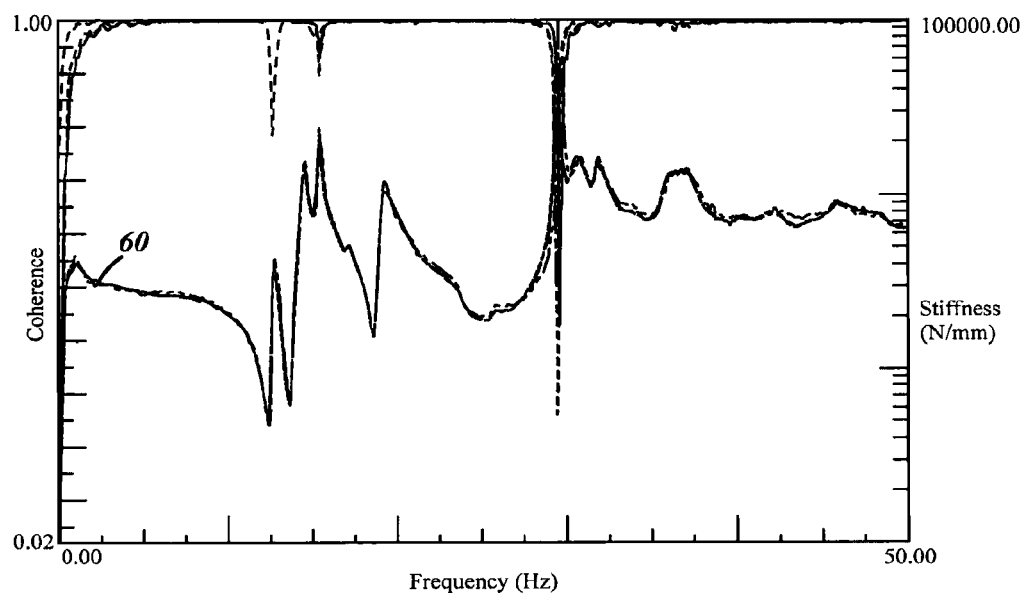
FIG. 7 is a graph used to determine the static and dynamic stiffness of a structure.

As shown in FIG. 7, the data from a transverse impact test has been plotted to show stiffness (N/mm) as a function of frequency (Hz) and also coherence. A transverse impact test is one where the direction of impact is along a plane that is generally perpendicular to the portion of the structure 14 being tested. As noted previously, the direction of impact could also be at other angles including along a plane that is generally parallel to the portion of the structure 14 being tested, or at an angle between the perpendicular and parallel planes.

At a low frequency, for example between 2 and 6 Hz, the dynamic stiffness has been found to be similar to the static stiffness. And with the exemplary equipment used, the coherence was at or very near 1.0 at about 2.5 Hz, so the stiffness at 2.5 Hz (represented by point 60 in FIG. 7) can reasonably be correlated to the static stiffness of the portion of the structure being tested. Accordingly, the system and method described herein can be used to determine a static stiffness of the structure, and this can be done independently of or at the same time that dynamic stiffness is determined and with the same equipment and method. This can greatly reduce the time and labor needed to conduct static stiffness measurements of a structure compared to prior methods that are very time consuming and labor intensive to set up, and to reset after each test run. This may reduce the cost and/or increase the number of tests that may be conducted to better understand the behavior of a structure and its dynamic and static stiffnesses.

What is claimed is:

1. A method for determining the stiffness of a structure, comprising:
   connecting a test member to the structure where the stiffness of the structure to which the test member is connected is being determined;
   directing a beam of light at a measurement surface carried by at least one of the test member or the structure;
   impacting an impact surface carried by the test member with a known impact force; and
   determining the movement of the measurement surface that is caused by the impact, where the measurement is determined as a function of changes in the length of the beam of light.

2. The method of claim 1 wherein the test member includes a body fixed to the structure, an impact surface carried by the body, and a measurement surface carried by the body, and wherein the step of impacting the impact surface is accomplished by striking the impact surface and the step of determining the movement is accomplished by determining the magnitude of movement of the measurement surface.

3. The method of claim 2 wherein the measurement surface is spaced about the periphery of the body from impact surface so that the beam of light is not interrupted by the act of impacting the impact surface.

4. The method of claim 2 wherein the impact surface is carried by an impact member positioned on the test member body and the system includes connecting the impact member to the body before impacting the impact surface.

5. The method of claim 2 wherein the measurement surface is carried by a measurement body positioned on the test member body and the system includes connecting the measurement body to the test member body before impacting the impact surface.

6. The method of claim 1 wherein the beam of light is provided by a laser generator having a sensitivity of 3,000 mV/mm or greater.

7. The method of claim 1 wherein the beam is directed at the measurement surface in a first direction and the impact surface is impacted in a direction opposite to the first direction.

8. The method of claim 1 wherein the beam is directed at the measurement surface in a first direction and the impact surface is impacted in the same direction as the first direction.

9. A system for determining the stiffness of a structure, comprising:
    a test member adapted to be connected to the structure, where the stiffness of the structure to which the test member is connected is being determined, and wherein the test member has an impact surface and a measuring surface;
    a beam generator providing a beam of light onto the measuring surface;
    an impactor having at least a portion moveable from a first position spaced from the impact surface to a second position engaged with the impact surface;
    a controller responsive to changes in the beam of light in response to movement of the measurement surface caused by impacting the impact surface with the impactor, wherein the controller determines the magnitude of movement of the measurement surface which is a function of the stiffness of at least a portion of the structure in the area where the test member is connected to the structure.

10. The system of claim 9 wherein the test member is stiffer than the structure to which it is connected in the direction of the engagement of the impactor with the impact surface.

11. The system of claim 9 wherein the beam generator includes a laser that directs a beam onto the measuring surface.

12. The system of claim 9 wherein the measuring surface and the impact surface are spaced apart so that movement of the impactor does not interfere with the beam of light.

13. The system of claim 9 wherein the position of at least one of the impact surface or the measurement surface is adjustable on the test member.

14. A system for determining the stiffness of a structure, comprising:
    a test member adapted to be connected to the structure and having an impact surface and a measuring surface;
    a beam generator providing a beam of light onto the measuring surface;
    an impactor having at least a portion moveable from a first position spaced from the impact surface to a second position engaged with the impact surface;
    a controller responsive to changes in the beam of light in response to movement of the measurement surface caused by impacting the impact surface with the impactor, wherein the controller determines the magnitude of movement of the measurement surface which is a function of the stiffness of at least a portion of the structure in the area where the test member is connected to the structure, wherein the position of a least one of the impact surface or the measurement surface is adjustable on the test member and wherein the test member includes a rigid tubular body and the impact surface is carried by an impact member adjustably positionable along the tubular body and the measurement surface is carried by a measurement body adjustably carried by the test member body at a location spaced from the impact member.

15. The system of claim 9 wherein the impact surface and the measurement surface face the same direction.

16. The system of claim 9 wherein the test member includes a body having an axis generally perpendicular to the portion of the structure to which the body is attached, and the beam of light is directed at the measurement surface perpendicular to the axis.

17. The system of claim 9 wherein the test member includes a body having an axis generally perpendicular to the portion of the structure to which the body is attached, and the beam of light is directed at the measurement surface parallel to the axis.

* * * * *